A. A. CARSON.
MIXING VALVE.
APPLICATION FILED MAR. 21, 1912.
1,152,291.
Patented Aug. 31, 1915.
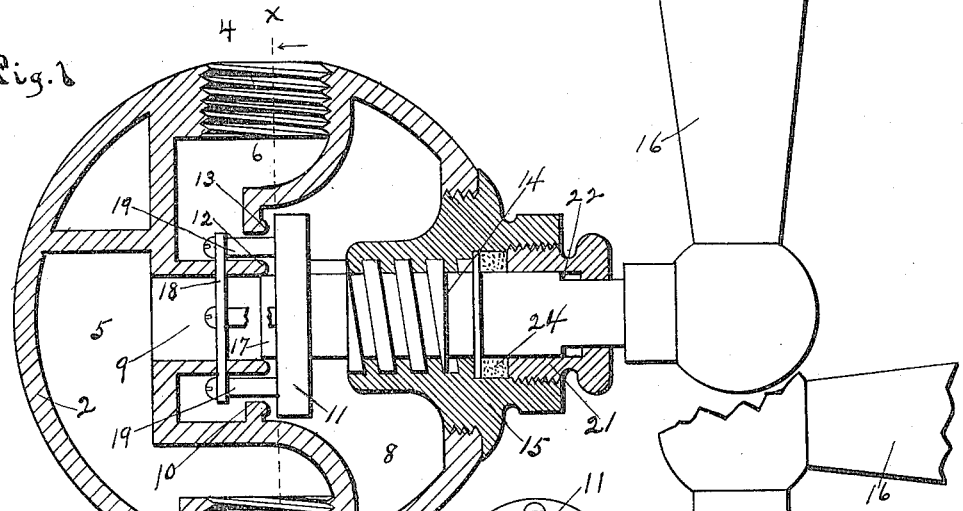
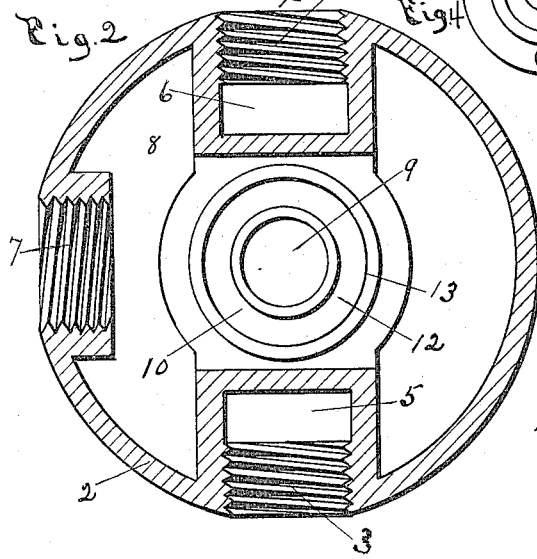
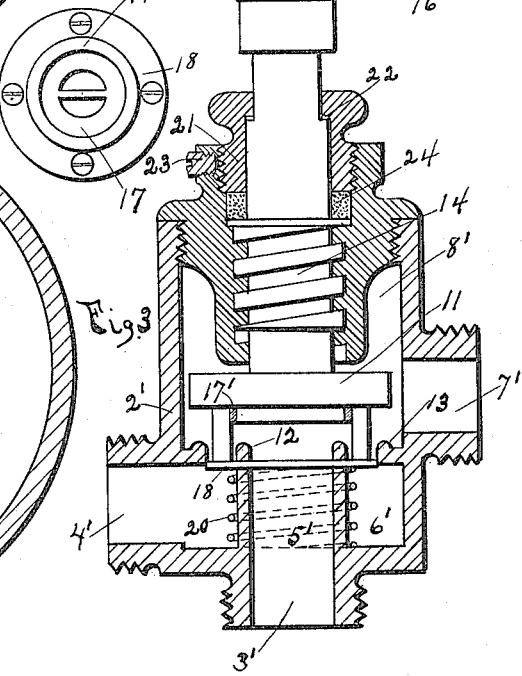
WITNESSES:
Harold Everett Heslitt
Anna B. Lindsay
INVENTOR
Alexander A. Carson,
BY
E. D. Chadwick,
ATTORNEY

UNITED STATES PATENT OFFICE.

ALEXANDER A. CARSON, OF BRAINTREE, MASSACHUSETTS.

MIXING-VALVE.

1,152,291.
Specification of Letters Patent.
Patented Aug. 31, 1915.

Application filed March 21, 1912. Serial No. 685,190.

*To all whom it may concern:*

Be it known that I, ALEXANDER A. CARSON, a citizen of the United States, residing at Braintree, in the county of Norfolk and State of Massachusetts, have invented new and useful Improvements in Mixing-Valves, of which the following is a specification.

My invention relates to valves for use in bathrooms, lavatories and the like, for the purpose of controlling the flow of hot and cold water, and is intended to provide a simple and practical valve of this character which will have certain capacities and advantages hereinafter set forth.

In particular, a valve embodying my invention is useful as an anti-scalding valve for shower baths, in that it may be so constructed that it will deliver a mixture of hot and cold water but cannot deliver water at a scalding temperature, and it may also be adapted to deliver hot water alone, or cold water alone, as well as a mixture of the same, the flow in either case being controllable by a single operating handle.

In the accompanying drawings, which illustrate the various features of my invention as preferably constructed, Figure 1 is a central section through a valve suitable for controlling the water supply for a shower bath, the plane of section being that occupied by the valve stem and the stem-operating handle and the movable valve member being shown in side elevation, with portions broken away; Fig. 2 is a section on the line $x-x$ in Fig. 1, with the movable valve member omitted; Fig. 3 is a view similar to Fig. 1 but illustrating certain modifications; and Fig. 4 shows in plan view the under side of a movable valve member hereinafter described.

Referring first to Figs. 1 and 2 of the drawings, 2 indicates the body portion of the valve, which may conveniently be made from a single casting and has two inlet passages 3 and 4 leading respectively to separated chambers 5 and 6 in the interior of the body portion 2, and also has an outlet passage 7 leading from another internal chamber 8, to which passages pipes and fittings suitable for conveying hot and cold water to the valve and for delivering water therefrom may be connected by screw threads in the usual manner, these pipes and fittings being omitted from the drawings as they may be of any usual or suitable construction.

The internal chambers 5 and 6 communicate with the discharge chamber 8 through passages 9 and 10, which are preferably concentric and are capable of being closed by means of a movable valve member 11 adapted to bear simultaneously on valve seats 12 and 13 surrounding the passages 9 and 10 respectively. In the construction shown in Fig. 1 the valve member 11 is carried and operated in both directions by a stem 14 having screw threads which turn in a nut 15 screwed into the body portion 2, so that said valve member may be forced down upon or lifted from the valve seats 12 and 13 by suitably manipulating the operating handle 16 secured to the projecting outer end of said stem 14, and in addition to the valve member 11 the form of valve shown in the drawings is provided with supplementary devices for controlling the passages 9 and 10 in different positions of said valve member 11 after the latter has been lifted from the valve seats 12 and 13, the arrangement being such that one of said passages is opened ahead of the other passage, and is closed after the latter passage has been opened, by a continuous movement of the handle 16. In the construction illustrated it is the inner passage 9 which remains closed when the valve member 11 is first unseated, and the supplemetary controlling device for this purpose is shown in Fig. 1 as consisting of a plunger-shaped follower 17 secured to the under side of said valve member and adapted to fit within and close the passage 9 during the first portion of the valve-opening movement, while after said follower 17 has been withdrawn from the passage 9 and the valve-opening movement has been continued to a certain extent the other supplementary controlling device, shown as consisting of a ring-shaped follower 18 carried by the lower ends of posts 19 projecting downward from the under side of the valve member 11, is drawn into the pasage 10 and closes the same.

The follower 18 is detachably secured to the posts 19 by means of screws entering the ends of said posts, as shown in Figs. 1 and 4, and hence can be readily removed to permit the renewal of a washer (not shown) which commonly provides the seating face of the movable valve member, such as 11, in a lavatory valve.

Assuming that one of the inlet passages 3 and 4 is connected to a hot water supply pipe and the other to a cold water supply pipe, the operation of the parts above described is as follows: So long as the valve member 11 is seated upon the valve seats 12 and 13 the passages 9 and 10 are thereby closed and no water can be discharged from the valve, but if the handle 16 is turned slightly the valve member 11 will be lifted from said seats and water (either hot or cold, according to which supply pipe is connected to the inlet passage 4) will then flow from the chamber 6 into the chamber 8 and be thence discharged from the valve, while no water can flow at this time from the chamber 5 since the passage 9 will remain closed by the follower 17. A further movement of the handle 16 in the same direction, however, will result in withdrawing the follower 17 from the passage 9, and thereupon water will flow from both the chambers 5 and 6 into the chamber 8 and therefore a mixture of hot and cold water will be discharged from the valve, while a still further movement of the handle 16 will result in drawing the follower 18 into the passage 10 and thus cutting off the flow from the chamber 6, so that water supplied through the chamber 5 alone will now be discharged from the valve. Thus by properly manipulating the handle 16 the valve may be made to deliver either hot water alone, or cold water alone, or a mixture of both, and the temperature of this mixture may be regulated by causing one or the other of the followers to enter the corresponding passage to a sufficient extent to check the flow therein as required.

Instead of operating the valve member 11 in both directions by means of the stem 14 and handle 16, said valve member may be forced upward from the valve seats by means of a spring 20, shown in Fig. 3, which spring is located between the follower 18 and the body portion of the valve and is normally under compression, while the stem 14 merely bears upon the top of valve member 11 and serves to force it downward upon the valve seats 12 and 13, from which said valve member is lifted by the spring 20 as fast as the stem 14 moves upward. The follower 17' shown in Fig. 3 has the form of a ring adapted to pass downward around the outside of the valve seat 12, instead of passing inside of said seat, the operation of the valve parts being otherwise the same as already described, although the contour and arrangement of the body portion 2', the inlet passages 3' and 4', the outlet passage 7', and the chambers 5', 6' and 8', are somewhat different from that shown in Figs. 1 and 2.

When the valve is used for a shower bath the hot water supply is preferably connected to that one of the inlet passages which is kept closed during the first part of the valve-opening movement, since by this arrangement it is impossible for the hot water to be turned on until after the cold water has been admitted to the discharge chamber, so that an anti-scalding valve is provided. In such case it is also advantageous to have the hot water supply connected to a valve-controlled passage which is concentric with and inside of the valve-controlled cold water passage, as is the case in the construction illustrated, since the hot water in passing into the discharge chamber is thus caused to encounter a surrounding wall of cold water simultaneously entering said chamber and is necessarily mixed therewith very thoroughly before it can leave the valve.

If it is not desired to obtain hot water alone from the valve the follower 18 will be unnecessary, but it may be retained without interfering with the action of the valve and without making it possible to obtain hot water alone therefrom (as is desirable in case the valve is used for a shower bath) by providing a stop for arresting the opening movement of the valve member 11 at some point before said follower 18 enters the passage which it controls. Such a stop is shown in the drawings as consisting of a plug 21 screwed into the outer end of the nut 15 and overlapping an annular shoulder 22 on the stem 14, said plug being adjustable inward and outward from the exterior of the valve and being held in any given position by a set screw 23. Thus by screwing said plug 21 inward to a sufficient extent the outward movement of the stem 14 may be arrested before the follower 18 becomes operative, with the result above described. A soft packing 24 surrounding the stem 14 beneath the plug 21 is preferably employed to prevent leakage around said stem, the packing being readily compressible so that adjustment of the plug 21 is not interfered with.

A valve having the general characteristics above described may evidently be used as a flow-controlling or mixing valve for various purposes, and it is to be understood that the construction and arrangement of its various parts may be considerably modified without departing from my invention.

I claim as my invention:

1. A valve of the character described, comprising a body portion containing separated inlet chambers, a discharge chamber and passages leading into the latter chamber from the other chambers respectively, said passages terminating in adjacent valve seats lying in the same plane, a movable valve member having a flat seating face overlying both of the valve seats and adapted to close said passages simultaneously, posts extending perpendicularly from the seating face of said valve member, means for operating the valve member, and a follower separably held against the outer ends of said posts in all positions of the valve member and arranged to close one of said passages after the valve member has been opened to a predetermined extent.

2. A valve of the character described, comprising a body portion containing separated inlet chambers, a discharge chamber and passages leading into the latter chamber from the other chambers respectively, a valve stem extending through and having a threaded engagement with the valve casing and movable longitudinally therein when rotated, a valve member carried by said stem and adapted to close said passages simultaneously, means movable with the valve member for keeping one of said passages closed during the first portion of its opening movement, a follower movable with the valve member for closing the other passage during a subsequent portion of said opening movement, an adjustable stop screwed into the valve casing from the exterior thereof and overlapping a shoulder on the longitudinally-movable valve stem, whereby the closing movement of said follower is limited, and means for locking said stop in adjusted position.

In testimony whereof, I have hereunto subscribed my name this nineteenth day of March, 1912.

ALEXANDER A. CARSON.

Witnesses:
OLIVER R. MITCHELL,
E. D. CHADWICK.

Copies of this patent may be obtained for five cents each, by addressing the "Commissioner of Patents, Washington, D. C."